United States Patent
Froehner et al.

(10) Patent No.: US 10,263,427 B2
(45) Date of Patent: Apr. 16, 2019

(54) METHOD AND SYSTEM FOR OPERATING AN AUTONOMOUS ENERGY SUPPLY NETWORK

(71) Applicant: SIEMENS AKTIENGESELLSCHAFT, Munich (DE)

(72) Inventors: Wiebke Froehner, Amberg (DE); Markus Reischboeck, Erlangen (DE); Thomas Werner, Rednitzhembach (DE)

(73) Assignee: Siemens Aktiengesellschaft, Munich (DE)

(*) Notice: Subject to any disclaimer, the term of this patent is extended or adjusted under 35 U.S.C. 154(b) by 11 days.

(21) Appl. No.: 15/446,200

(22) Filed: Mar. 1, 2017

(65) Prior Publication Data
US 2017/0256948 A1 Sep. 7, 2017

(30) Foreign Application Priority Data
Mar. 1, 2016 (EP) .................................. 16158006

(51) Int. Cl.
*G05B 19/042* (2006.01)
*H02J 3/38* (2006.01)
(Continued)

(52) U.S. Cl.
CPC ............ *H02J 3/382* (2013.01); *G05B 19/042* (2013.01); *H02J 3/381* (2013.01);
(Continued)

(58) Field of Classification Search
CPC ........... G05B 19/042; G05B 2219/2639; H02J 2003/003; H02J 2003/007;
(Continued)

(56) References Cited

U.S. PATENT DOCUMENTS 8,862,279 B2* 10/2014 Darden, II ........... G06Q 10/063
 700/291
8,965,590 B2* 2/2015 Boardman .......... H02J 13/0079
 700/289
(Continued)

FOREIGN PATENT DOCUMENTS

EP 2953230 A1 9/2015

OTHER PUBLICATIONS

Hristiyan Kanchev et al, "Energy Management and Operational Planning of a Microgrid With a PV-Based Active, Generator for Smart Grid Applications", IEEE Transactions on Industrial Electronics, vol. 58, No. 10, Oct. 2011, pp. 4583-4592, DOI: 10.1109/TIE.2011.2119451.
(Continued)

*Primary Examiner* — Abdelmoniem I Elamin
(74) *Attorney, Agent, or Firm* — Laurence Greenberg; Werner Stemer; Ralph Locher (57) ABSTRACT

An autonomous energy supply network has energy producers and energy consumers that are driven by a local control device. The following steps reduce the parameterization outlay required for the operation of the autonomous energy supply network: provision of model data of the autonomous energy supply network in a data memory of a computing device superordinate to the local control device, the model data specifying the respective energy producers and their operating parameters; determination of an operating plan for the autonomous energy supply network with the computing device by using the model data, the operating plan specifying the operating state of the autonomous energy supply network during a particular time interval; transmission of the operating plan to the local control device; and driving of the energy producers and/or the energy consumers according to the specifications of the operating plan by the local control device.

21 Claims, 5 Drawing Sheets

(51) Int. Cl.
*H02J 3/00* (2006.01)
*H02J 3/14* (2006.01)

(52) U.S. Cl.
CPC ....... *G05B 2219/2639* (2013.01); *H02J 3/383* (2013.01); *H02J 3/386* (2013.01); *H02J 2003/003* (2013.01); *H02J 2003/007* (2013.01); *H02J 2003/146* (2013.01); *Y02E 10/563* (2013.01); *Y02E 10/763* (2013.01); *Y04S 20/224* (2013.01)

(58) Field of Classification Search
CPC ...... H02J 2003/146; H02J 3/381; H02J 3/382; H02J 3/383; H02J 3/386; Y02E 10/563; Y02E 10/763; Y04S 20/224
See application file for complete search history.

(56) References Cited

U.S. PATENT DOCUMENTS

| | | | |
|---|---|---|---|
| 8,972,070 B2 * | 3/2015 | Sun | G06F 17/30557 700/286 |
| 2010/0023174 A1 | 1/2010 | Nagata et al. | |
| 2011/0040550 A1 * | 2/2011 | Graber | G06Q 10/06 703/18 |
| 2011/0231028 A1 * | 9/2011 | Ozog | G06Q 10/06 700/291 |
| 2013/0144451 A1 * | 6/2013 | Kumar | G05B 13/02 700/291 |
| 2013/0190940 A1 * | 7/2013 | Sloop | G05B 15/02 700/291 |
| 2013/0261823 A1 * | 10/2013 | Krok | G05F 5/00 700/291 |
| 2014/0172182 A1 | 6/2014 | Subbotin et al. | |
| 2014/0252855 A1 | 9/2014 | Watanabe et al. | |
| 2014/0277599 A1 | 9/2014 | Pande et al. | |
| 2015/0255982 A1 | 9/2015 | Sasaki et al. | |

OTHER PUBLICATIONS

Farid Katiraei, et al, "Microgrids Management—Controls and Operation Aspects of Microgrids", IEEE Power and Energy Magazine, May/Jun. 2008.

* cited by examiner

METHOD AND SYSTEM FOR OPERATING AN AUTONOMOUS ENERGY SUPPLY NETWORK

CROSS-REFERENCE TO RELATED APPLICATION

This application claims the priority, under 35 U.S.C. § 119, of European application EP 16158006.3, filed Mar. 1, 2016; the prior application is herewith incorporated by reference in its entirety.

BACKGROUND OF THE INVENTION

Field of the Invention

The invention relates to a method for operating an autonomous energy supply network which comprises a plurality of energy producers and a plurality of energy consumers. The invention also relates to a system for operating such an autonomous energy supply network.

In response to problems relating to the supply reliability of energy supply networks and the increasing proportion of regenerative energy producers (for example wind power plants, photovoltaic plants), autonomous energy supply networks, also referred to below as "microgrids," have recently been used increasingly. Such microgrids are relatively small energy supply networks comprising energy producers and energy consumers. Besides these, such microgrids may also comprise electrical energy storage units. Such energy storage units will be considered below either as energy producers (the energy storage unit delivers electrical power) or energy consumers (the energy storage unit draws electrical power), depending on their mode of operation. Usually, a microgrid is configured in terms of the capacities of the available energy producers and energy consumers so that the production and the consumption of electrical energy at least approximately balance one another, so that the term autonomous, i.e. self-supplying, operation may be used.

Furthermore, either microgrids are not at all connected to other energy supply networks (for example microgrids on islands or in remote regions), or they are coupled at a network connection point to a superordinate energy supply network (distribution grid) and can draw electrical power therefrom or deliver electrical power thereto. In the case of the latter variant, there is the possibility of a power balance with the superordinate energy supply network, while at the same time ensuring that the internal electricity supply of the microgrid can be maintained by means of its own energy producers in the event of failure of the superordinate energy supply network.

The operation of a microgrid may be optimized in terms of various parameters. For example, the microgrid may be operated with the lowest possible costs or the lowest possible $CO_2$ emission. In this context, both conventional energy producers (for example diesel generators) and regenerative energy producers (energy producers which produce electrical energy from renewable sources, for example the sun, wind) and any energy storage units are to be considered, modeled and controlled. Specifically, in order to make the network operation as efficient as possible, one essential aspect consists in predicting future energy production inside the network, and respectively the future energy consumption inside the microgrid, for the microgrid, both quantities usually being at least partially dependent on the weather, and in optimizing the portfolio mix, i.e. the breakdown of the use of the individual energy producers.

The solutions currently available for energy automation in microgrids are essentially based on conventional management systems, such as are for example also used in station automation (for example the Siemens® SICAM® series) or network management technology (for example the Siemens® Spectrum Power® series). In principle, these systems are highly suitable for the control and regulation (closed-loop control) of microgrids. However, their operating and modeling concepts primarily involve technically trained specialist personnel, who are usually not available for the applications mentioned above and whose use furthermore entails relatively high costs. Furthermore, the cost/benefit ratio of such automation solutions is disadvantageous for the order of magnitude of microgrids, which usually have only a few MW (megawatts) of production power. This relates not only to the system costs (i.e. components and software of the respective automation solution), but above all to the outlay which is required for parameterization and commissioning. Specifically, in this context, setting up the usually required mathematical modeling functions in particular leads to high manual analysis and parameterization outlay. Furthermore, the known automation solutions generally assume constant communication between the microgrids and the management center. This is already problematic particularly when microgrids are used to ensure safe electricity supply in remote regions, or in the event of failure of the superordinate energy supply network (which usually also involves the failure of long-distance communication).

Furthermore, U.S. patent application US 2010/0023174 A1 discloses a system for controlling microgrids, in which microgrids are controlled by respective individual local control devices and the local control devices of the microgrids exchange control data with one another, so as also to incorporate the operation of a superordinate energy supply network into the optimization. In that solution as well, there is a high configuration outlay for the individual local control devices.

SUMMARY OF THE INVENTION

It is accordingly an object of the invention to provide a method and a system for operating an autonomous energy supply network which overcome the above-mentioned and other disadvantages of the heretofore-known devices and methods of this general type and which reduce the parameterization outlay required for the operation of an autonomous energy supply network (microgrid).

With the above and other objects in view there is provided, in accordance with the invention method of operating an autonomous energy supply network, the energy supply network including a plurality of energy producers and a plurality of energy consumers, and a local control device configured to drive at least one of the energy producers and energy consumers. The method comprises the following steps:

providing model data of the autonomous energy supply network in a data memory of a computing device that is superordinate to the local control device, the model data specifying the respective energy producers and associated operating parameters;

determining an operating plan for the autonomous energy supply network with the computing device by using the model data, the operating plan specifying an operating state of the autonomous energy supply network during a particular time interval;

transmitting the operating plan to the local control device; and driving one or both of the energy producers and the energy consumers with the local control device according to specifications of the operating plan.

In other words, a local control device which is configured to drive the energy producers and/or the energy consumers is provided; the following steps are carried out during the performance of the method: model data of the autonomous energy supply network are provided in a data memory of a computing device superordinate to the local control device, the model data specifying the respective plants of the microgrid, in particular the available energy producers, but also energy consumers and/or storage units, and their operating parameters; an operating plan for the autonomous energy supply network is determined with the computing device by using the model data, the operating plan specifying the operating state of the autonomous energy supply network during a particular time interval; the operating plan is transmitted to the local control device; and the energy producers and/or the energy consumers are driven according to the specifications of the operating plan by the local control device.

The particular advantage of the method according to the invention is that almost all the parameterization of the local control device is carried out not on site but by means of the computing device. This avoids the need for the operator of the microgrid to use trained personnel on site. Furthermore, it is possible to use as local control devices relatively simple apparatuses, on which it is not necessary to place stringent requirements in terms of their computing power since the computation-intensive processes, in particular the mathematical operational optimization, are carried out by means of the computing device.

The model data provided by means of the computing device include inter alia, for example, the type and installation site of the respective energy producer, a spatial orientation, a name, minimum and maximum production powers of the energy producer, efficiency characteristics, fuel cost of any fuel used or battery capacities.

According to one advantageous refinement of the method according to the invention, in order to determine the operating plan by means of the computing device for the respective time interval, an expected delivery power of the respective energy producer is determined, and the expected delivery power of the respective energy producer is used in order to determine the operating plan.

In this embodiment, the operating predictions of the respective energy producers are advantageously used as a basis for optimization of the operation. In this way, the expected delivery power of each energy producer can be predicted per se, so that, for example, for the time interval in question it is possible to carry out planning of whether electrical power needs to be drawn from any superordinate distribution network or can be delivered thereto, for example in order to optimize a monetary gain.

In this context, according to one advantageous embodiment of the method according to the invention, furthermore, a weather forecast for the region of the autonomous energy supply network is determined for the respective time interval by means of the computing device, and for those energy producers whose delivery power depends on the current weather conditions in the region of the respective energy producer, the expected delivery power of the respective time interval is determined by using that information of the weather forecast which is relevant for the operation of the respective energy producer, as well as at least some of the model data.

Particularly those energy producers which produce electrical energy from rapidly renewable energy sources (wind power, solar radiation) are dependent to a particular extent on the respective weather situation in the region of the respective energy producer. According to the embodiment mentioned last, the computing device then determines a weather forecast for the region of the respective energy producers. Since microgrids often have only a small spatial extent, in such cases it may be sufficient to determine the weather situation only for the region of the microgrid, and to use this weather situation for all available energy producers. On the basis of the weather situation, or information which is relevant for the production of electrical energy by the respective energy producer (for example wind strength, cloud cover, length of sunlight and incidence angle of the sunlight), with knowledge of particular model data for the respective energy producer (for example efficiency, installation site, orientation), the computing device can determine the expected delivery power for the time interval in question. Assumptions may thus also be made for such energy producers by means of the computing device, without the local control devices needing to be used therefor.

According to another advantageous embodiment of the method according to the invention, the model data are acquired as user entries via a data editor provided by the computing device or connected thereto, and are stored in the data memory of the computing device.

This provides a simple possibility for acquisition of the model data by the computing device. Manual entry at one of the local control devices is again not necessary.

According to another advantageous embodiment of the method according to the invention, furthermore, the computing device is formed by a data processing device that is configured as a cloud computer system.

In this embodiment, the computing device is configured in a particularly flexible way. A cloud computer system is in this case intended to mean an arrangement having one or more data storage devices and one or more data processing devices, which may be configured by suitable programming in order to carry out any desired data processing operations. The data processing devices in this case generally constitute universal data processing devices (for example servers) which initially have no specific configuration in terms of their design and their programming. Only by programming having been carried out can the universal data processing device be set up to carry out specific functions. If the cloud computer system comprises a plurality of individual components, these will be connected to one another in a suitable way for data communication (for example by a communication network). A cloud computer system may be supplied with any desired data for data storage and/or processing. The cloud computer system itself makes the stored data and/or the results of the data processing carried out available in turn to other apparatuses for example the local control device of the microgrid and a computer workstation connected to the cloud computer system. A cloud computer system may, for example, be provided by a computing center or also a plurality of networked computing centers. Usually, a cloud computer system is configured to be spatially remote from the microgrid.

The cloud computer system may, for example, be operated by the same operator as the microgrid. For example, it could in this case be a server system or a computing center of the same operator. Provision may, however, also be made for the cloud computer system to be assigned to an operator other than the operator of the microgrid. For the operator of the microgrid, this may have the advantage that they do not themselves have to look after the operation and maintenance of the cloud computer system, but have transferred these tasks to the operator of the cloud computer system who offers this as a service.

According to another advantageous embodiment of the method according to the invention, furthermore, the operating plan for the respective time interval may comprise an overall operating plan, which specifies an electrical power at a network connection point of the autonomous energy supply network, and partial operating plans for the energy producers and/or energy consumers of the autonomous energy supply network.

In this way, not only can the individual energy producers and/or consumers of the microgrid be driven for operation, but an electrical power at the network connection point may also be specified by the overall operating plan. In this way, for example, it is possible to determine that the microgrid should draw or deliver a predetermined electrical power in the time interval, or should be operated fully autonomously in island operation. In the case of those microgrids which do not have any coupling to a distribution network anyway, the electrical power at the (in this case non-existent) network connection point is to be set at zero each time.

In respect of the partial operating plans, provision may furthermore specifically be made that they respectively comprise at least one specification of an activation state and a setpoint value for the power output or the power demand of the respective energy producer or energy consumer.

According to another embodiment, in respect of the partial operating plans, provision may furthermore be made that these also comprise a specification of the costs which are incurred during the energy production or the energy consumption of the respective energy producer or energy consumer. Costs which are incurred during the energy production are, in particular, operating costs (including any fuel costs) and procurement costs of the plant in question. Costs which are incurred during energy consumption are, for example, operating and procurement costs of an energy storage unit, but also payments which must be made for exceeding a power limit which has been contractually agreed (for example with an operator of a distribution network). Consumption costs may furthermore be relevant when the operator of the microgrid has a supply contract with an operator of a superordinate distribution network.

In respect of operation of the microgrid, according to one advantageous embodiment provision may furthermore be made that, during operation of the autonomous energy supply network by the local control device, the current power balance of the autonomous energy supply network is formed as the difference between the power delivered to the autonomous energy supply network and the power drawn therefrom, a positive reserve power and a negative reserve power of the autonomous energy supply network are determined by the local control device, the current power balance is compared with the positive and negative reserve powers, and the result of the comparison is used for driving the energy producers.

The positive reserve power is in this case determined as the difference between the maximum possible power output and the actual current power output of all active (switched-on) energy producers. Correspondingly, the negative reserve power is determined as the difference between the actual current power output and the minimum possible power output of all active energy producers.

The advantageous embodiment mentioned last allows regulation of the operation of the microgrid with the aid of only a few measurement quantities and simple calculations. These may also be carried out with relatively simple control devices, without excessively high computing power demands having to be placed on the latter.

In this context, according to another advantageous embodiment of the method according to the invention, provision may specifically be made that, in the event of a power balance which is less than or equal to the positive or negative reserve power, the energy producers respectively switched on are driven correspondingly in order to adapt their power to be delivered, and in the event of a power balance which is greater than the positive or negative reserve power, the activation state of at least one energy producer is modified.

In this embodiment, operation of the microgrid by a relatively simple regulating rule is made possible. So long as equalization of the power balance can be carried out by driving active energy producers within the reserve power, this is done. When the positive reserve power is no longer sufficient, a further (previously switched-off) energy producer is put into operation. When the negative reserve power is no longer sufficient (too much power is fed into the microgrid), an active energy producer is switched off. These steps are carried out until there is an equilibrated power balance.

The order in which the energy producers are switched on or off may be determined by optimization parameters. For example, those producers whose operation involves the lowest production costs may be switched on first, so that the same inactive energy producer which entails the lowest production costs is always switched on. In the converse case, when switching off, those energy producers with the highest energy production costs are taken out of operation first, etc. A further optimization may, for example, be a $CO_2$ emission of the respective energy producer.

Furthermore, according to another advantageous embodiment, for the case in which, in the event of a power balance which is greater than the positive or negative reserve power, there is no further energy producer whose activation state can be modified, the activation state of at least one energy consumer is modified.

In this embodiment, if no further regulation by switching energy producers on or off is possible, action is taken on the load side of the microgrid. Thus, when necessary, loads are switched on or off in order to achieve an equilibrated power balance in the microgrid.

According to another advantageous embodiment of the method according to the invention, furthermore, measurement values which specify an operating state of the energy producers and/or energy consumers and/or of the entire autonomous energy supply network at a network connection point are acquired by means of the local control device during operation of the autonomous energy supply network, at least some of the measurement values and/or values derived therefrom are transmitted to the computing device, and the computing device determines an updated operating plan for the current time interval or a time interval subsequent thereto by using the transmitted measurement values and/or the values derived therefrom.

In this way, the operation of the microgrid can be adjusted adaptively to current changes. For example, discrepancies in the prediction of the expected power delivered may be balanced or failure of an energy producer planned into the operation of the microgrid may be compensated for. The relatively computation-intensive adaptation of the operating plans, in which recalculation of the optimization needs to take place at least partially, is carried out by the computing device, so that the local control devices are relieved of this.

According to another advantageous embodiment of the method according to the invention, furthermore, respective operating plans for a plurality of autonomous energy supply networks are determined by the computing device, and the respective energy producers and/or energy consumers of the plurality of autonomous energy supply networks are driven according to the specifications of the respective operating plan by the respective local control device.

With this solution, services for a plurality of microgrids are therefore provided by the computing device. These microgrids may be assigned to the same or different network operators. In the latter case, care will be taken to ensure data security on the computing device by suitable measures.

The aforementioned object is also achieved by a system for operating an autonomous energy supply network, the autonomous energy supply network comprising a number of energy producers and a number of energy consumers.

With the above and other objects in view there is also provided, in accordance with the invention a system for operating such an autonomous energy supply network, the system comprising:

a local control device configured to drive the energy producers and/or the energy consumers; and a computing device that is superordinate to the local control device, the computing device including a data memory for providing model data of the autonomous energy supply network, which specify the respective energy producers and their operating parameters; wherein the computing device being adapted to determine an operating plan for the autonomous energy supply network by using the model data and to transmit the operating plan to sid local control device, the operating plan specifying an operating state of the autonomous energy supply network during a particular time interval; and the local control device being configured to drive the energy producers and/or the energy consumers according to the specifications of the operating plan.

In other words, a local control device which is configured to drive the energy producers and/or the energy consumers is provided, as well as a computing device which is superordinate to the local control device and comprises a data memory for providing model data of the autonomous energy supply network, which specify the respective energy producers and their operating parameters. The computing device is in this cases determines an operating plan for the autonomous energy supply network by using the model data and transmits the operating plan to the local control device. The operating plan specifies the operating state of the autonomous energy supply network during a particular time interval. The local control device drives the energy producers and/or the energy consumers according to the specifications of the operating plan.

Specifically, in respect of the system according to the invention, provision may be made that the system is adapted to operate a plurality of autonomous energy supply networks, and the respective autonomous energy supply networks are respectively assigned their own local control devices, which are connected to the computing device.

In respect of the system according to the invention, all the comments made above and below about the method according to the invention apply, and vice versa, in a corresponding way, in particular the system according to the invention being adapted to carry out the method according to the invention in any desired embodiment or a combination of any desired embodiments. In respect of the advantages of the system according to the invention as well, reference is made to the advantages described for the method according to the invention.

Other features which are considered as characteristic for the invention are set forth in the appended claims.

Although the invention is illustrated and described herein as embodied in a method and system for operating an autonomous energy supply network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
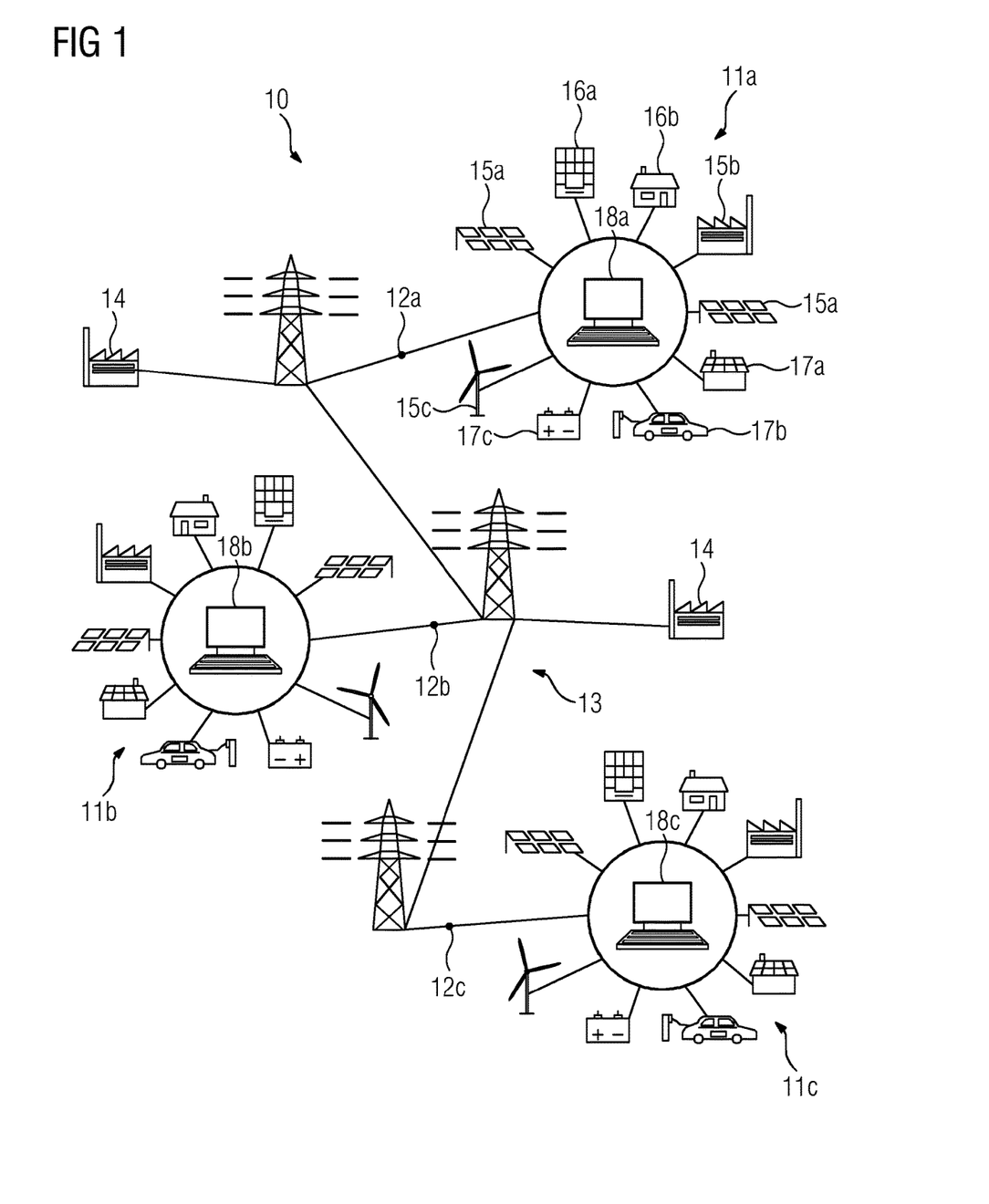
FIG. 1 shows a schematic overview of an energy supply system having a plurality of autonomous energy supply networks (microgrids) connected to a distribution network.

Referring now to the figures of the drawing in detail and first, particularly, to FIG. 1 thereof, there is shown a very highly schematic representation of an energy supply system 10, in which a plurality of autonomous energy supply networks (microgrids) 11a-c are coupled to a distribution network 13 at respective network connection locations 12a-c. Energy producers in the form of power plants 14, which ensure a basic supply of electrical energy, are connected to the distribution network 13.

The microgrids themselves comprise a number of energy producers 15a-c and energy consumers 16a-c, which are indicated merely by way of example in FIG. 1. Specifically, for example, there may be energy producers in the form of photovoltaic plants (energy producer 15a), small power plants, for example combined heat and power plants, biogas plants, microturbines, etc. (energy producer 15b) or wind power plants (energy producer 15c), as well as energy consumers in the form of office or business buildings (energy consumers 16a) or houses (energy consumers 16b). Furthermore, there may also be so-called "prosumers" 17a-c (amalgamation of producer and consumer) which can both produce and draw electrical energy depending on the operating mode. These include, for example, buildings with their own electricity production modules, for example houses with photovoltaic modules (prosumer 17a), electrical vehicles with an electrical energy storage unit (prosumer 17b) and static electrical energy storage units, for example battery systems (prosumer 17c). Such prosumers are regarded and referred to as energy producers or energy consumers in the context of this description, depending on their operating mode. For example, a static storage unit is regarded as an energy producer while it is delivering electrical energy, but it is considered an energy consumer while it is drawing electrical energy.

The energy producers and energy consumers represented in FIG. 1 are merely to be understood by way of examples. There may, of course, be microgrids with any desired number and composition of energy producers and consumers.

In contrast to the representation in FIG. 1, an autonomous energy supply network/microgrid may also be operated without coupling to a distribution network. This is the case, for example, for islands or remote regions.

In order to control the operation of the microgrid, local control devices 18a-c are provided, which are likewise indicated only symbolically in FIG. 1. With these local control devices, in accordance with an operating plan which respectively specifies an operating state of the microgrid for a particular time interval (for example with a duration of 15 minutes), the energy producers and/or consumers present in the microgrid are driven in such a way that the operation of the microgrid corresponds to a particular regulation strategy. For example, the regulation strategy may consist of establishing a cost-optimized mode of operation of the microgrid. For this, it is necessary to take into account the respective energy production costs that are associated with the respective energy producers (for example current fuel prices, operating costs of a wind power plant, etc.), as well as any electricity price when drawing electricity from the distribution network 13 or delivering electricity to it. Another regulation strategy may be based on a mode of operation with the lowest possible $CO_2$ emission or a fully autonomous mode of operation (island operation).

In order to plan and optimize the operation of a microgrid, a prediction of the electrical power respectively produced in the microgrid and drawn from the microgrid in the time interval in question is necessary. To this end, scheduling and parameterization as well as modeling of the energy producers and consumers respectively present must be carried out. These processes require a high level of technical understanding and data processing devices with a high computation capacity. Neither is efficient for singular local operation of an individual microgrid in terms of the cost/benefit ratio.

Figure 2:
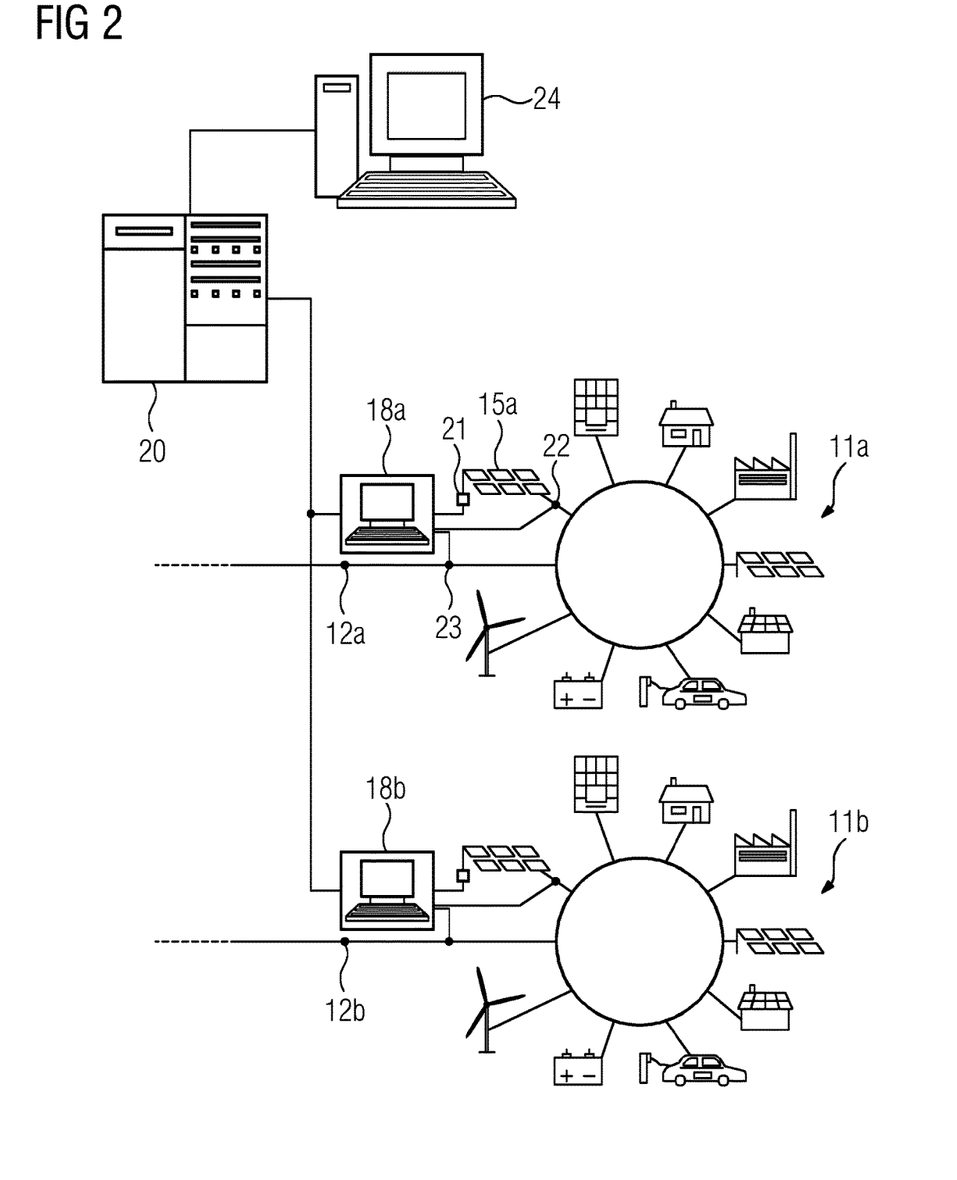
FIG. 2 shows a schematic representation of two microgrids, which are operated by means of local control devices and a superordinate computing device.

In the present case, for operation of the microgrid, division of the automation solution into two is therefore proposed, as is schematically illustrated in FIG. 2. In this regard, FIG. 2 shows a subregion of the energy supply system 10 of FIG. 1 with the microgrids 11a and 11b, which are coupled at network connection locations 12a,b to the distribution network (not further shown in FIG. 2). The local control devices 18a,b of the respective microgrid 11a,b are suitably connected on the one hand to the energy producers and consumers of the respective microgrid 11a,b, and on the other hand to a superordinate computing device 20.

The connection to the energy producers and consumers is used to send control signals to the respective energy producer and consumer, in order to adapt the operating state thereof according to the operating plan for the respective time interval. Furthermore, the respective local control device 18a,b is connected to measurement sensors which are used to measure the delivery or demand of electrical energy by the respective energy producers or consumers as well as in the region of the network connection locations 12a,b. In this way, the local control device is respectively provided with current operational data of the microgrid. In order to ensure clarity, only a connection of the local control device 18a,b to the energy producer 15a is represented merely by way of example and generically for all other connections in FIG. 2. The connection in this case comprises a first connection to a control module 21 of the energy producer 15a, in order to influence the operating state of the energy producer by control signals, as well as a second connection to a measurement sensor 22 (indicated only schematically) for recording the power delivered by the energy producer 15a (for example by suitable measurement of the current and voltage at the measurement location of the measurement sensor). Also shown is a connection to a further measurement sensor 23, with which the power in the region of the network connection location 12a,b is measured. The connections between the respective local control device 18a,b and the individual energy producers or consumers may be configured in any desired suitable form (for example wirelessly or wired) and be based on one or more communication protocols (for example according to IEC 61850, IEC 61870-5-104, DNP3(i), XMPP, Modbus TCP/RTU).

Computation-intensive functions as well as the scheduling and parameterization of the respective microgrid are concentrated in the computing device 20, which may for example be a cloud computer system. For the entry of parameters and model data, the computing device 20 is connected to a data editor 24, which may be configured as a separate data processing device (for example a workstation) or as an integral component of the computing device 20 itself.

By the division of the automation system into two, processes which require a high level of expert knowledge, large manual outlay and/or a high computation capacity are relocated from the respective local control device 18a,b to the computing device 20, and the efficiency of the overall system is thus increased. In this way, simpler and therefore more economical apparatuses can be used as local control devices 18a,b; furthermore, much less local personnel outlay is incurred for the configuration and operation of the respective microgrid. The connection between the respective control device 18a,b and the computing device 20 may be configured in any desired suitable form, for example as a wired Ethernet connection. It is possible to use any desired communication protocols, for example a protocol defined in the standard IEC 61850.

The computing device 20 may likewise be assigned to the operator of one or all microgrids 11a,b. As an alternative thereto, the computing device 20 may also be operated by a service provider who has expert knowledge in the field of the control of microgrids and offers the parameterization and calculation of the respective optimized operating plans as a service for the respective operator of a microgrid.

Specifically, the system for operating a microgrid is constructed as follows and is operated as follows:

As described above, the local control device 18a,b undertakes the communication on the one hand with the respective energy producers and consumers, and on the other hand with the computing device 20.

Figure 3:
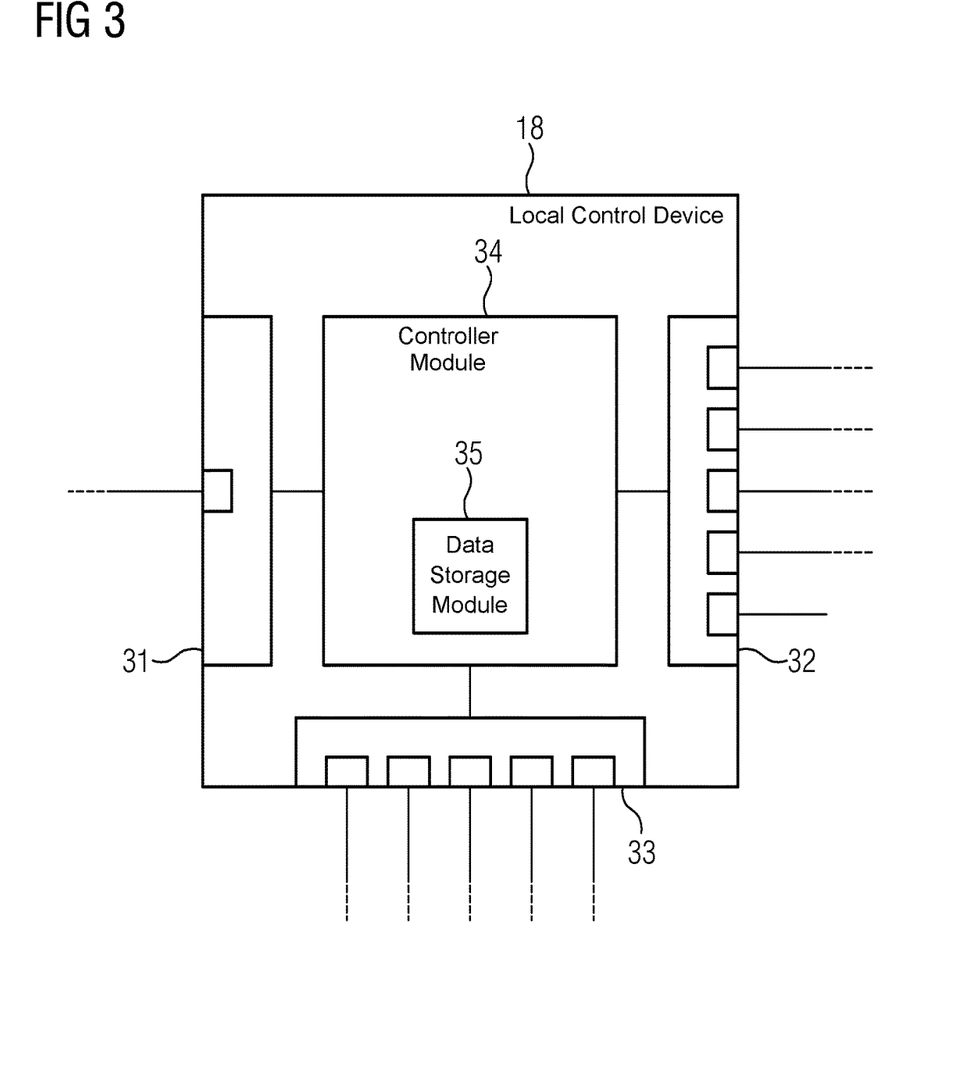
FIG. 3 shows a schematic representation of a local control device.

To this end, as shown in FIG. 3, the local control device 18 comprises a first communication interface 31 for communication with the computing device 20 and a second communication interface 32 for transmission of control signals to the respective energy producers and consumers. An input/output interface 33 is furthermore used to acquire measurement values of the respective measurement sensors.

In this case, the measurement values may be transmitted by fixed wiring to the input/output interface 33 of the control device 18, or may be converted into a telegram in an intermediate process and submitted as or telegram content to the input/output interface 33. The input/output interface 33 is to be configured accordingly as a measurement value acquisition device or as a communication device. Furthermore, the control device 18 comprises a controller module 34 which carries out the functions necessary for the driving of the energy producers and consumers. The controller module may for example be a microprocessor, an ASIC or an FPGA, or the like.

Figure 4:
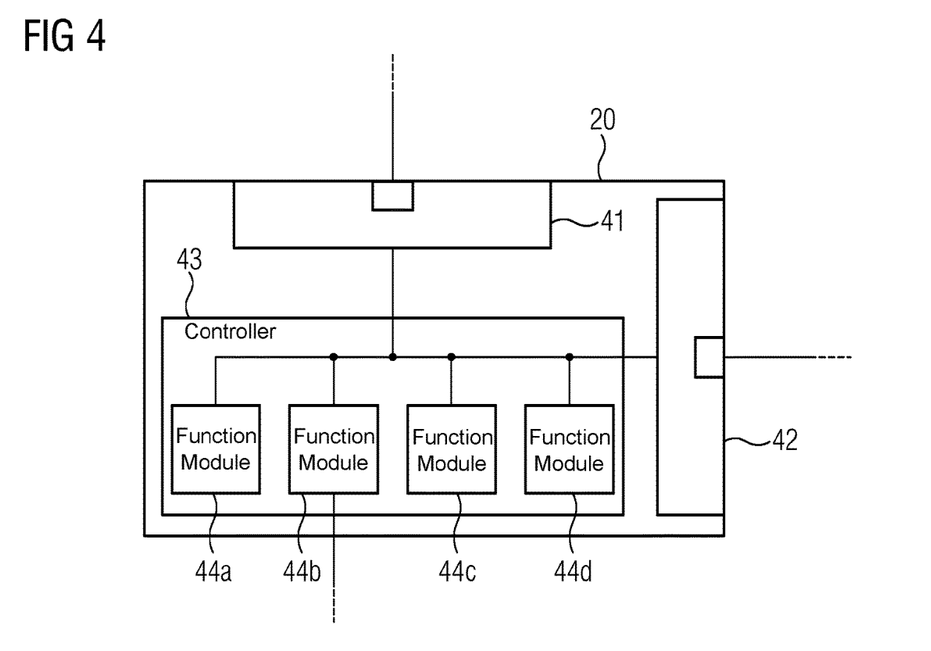
FIG. 4 shows a schematic representation of the computing device.

On the basis of heuristics or mathematical optimization methods, the computing device 20 comprises operating plans for the energy producers and consumers of the respective microgrid, which ensure a stable system state of the microgrid. The computing device 20 is configured as shown in FIG. 4. According to FIG. 4, the computing device 20 comprises an interface 41 for data exchange with the data editor 24 (cf. FIG. 2) and a communication interface 42 for connection to one or more local control devices 18. The computing device furthermore comprises a controller 43, which is adapted to carry out function modules 44a-d.

The representation of the computing device 20 in FIG. 4 is to be regarded as purely functional; as already mentioned above, the computing device may either be an individual data processing device or a computer facility, for example in the form of a cloud computer system, which provides the elements and functions shown in FIG. 2.

By means of the data editor connected to the interface 41, the essential model data of the energy producers and consumers can be parameterized. These model data include the energy producers and consumers and data specifying their operating parameters, for example minimum and maximum production powers of the energy producers, efficiency characteristics fuel prices or battery capacities. These model data are stored in the function module 44a, which is a data storage module of the computing device 20; a subset relevant for the respective local control device is forwarded to the local control device 18 and stored in the local data storage module 35 (cf. FIG. 3).

The function module 44b is a module for providing weather forecasts, which interrogates suitable weather services according to the installation site of the microgrid in order to obtain local predictions of weather parameters such as wind speed, wind direction, insolation (solar irradiation), etc. The interrogated weather services may be provided by the computing device 20 itself or by external providers (weather service providers).

The function module 44c is a module for calculating expected delivery powers of those energy producers whose energy production power depends on the respective current weather situation (for example photovoltaic plants, wind power plants, etc.). In order to calculate the expected delivery power, at least relevant parts of the weather information provided by the function module 44b and at least parts of the model data (for example efficiency characteristics) stored in the function module 44a are used.

The function module 44d is a module for calculating operating plans of the individual microgrids. The operating plans for the respective time interval may in this case comprise on the one hand partial operating plans of the individual energy producers and on the other hand an overall operating plan, which indicates the power flow at the network connection point. The function module 44d uses a mathematical operational optimization, for example based on mixed integer linear programming, and optimizes the operation of the microgrid in respect of predetermined parameters, for example the power exchange of the microgrid with the distribution network, the operating costs or the $CO_2$ emission.

The computing device 20 and the local control device 18 of the respective microgrid interact as follows:

Before commissioning of the microgrid, data entry for scheduling and parameterization of the respective microgrid is carried out. To this end, the user first enters the model data of the microgrid by means of the data editor 24. From the entered data, the data editor 24 generates data models for the mathematical operational optimization. The model data and the data models derived therefrom are stored in the function module 44a.

The computing device 20 furthermore sends relevant model data to the respective local control device. Such model data as are necessary or advantageous for the operation of the respective microgrid 11 by the control device 18, and relate to the energy producers or consumers present in the respective microgrid 11, are regarded as relevant.

During operation, the computing device 20 interrogates current weather forecasts of the weather services at cyclic intervals, for example once per day, and stores them in the function module 44b. With the aid of these weather forecasts, the function module 44c calculates the expected energy delivery for each energy producer within the time interval to be considered, and transmits this information to the function module 44d, which calculates an operating plan for the respective microgrid by using this information and/or sends them directly to the local control unit. To this end, corresponding optimization of the operation of the microgrid is carried out according to the optimization rules. With the function component 44d, operating plans are in this case respectively calculated for successive time intervals, for example lasting 15 minutes.

Lastly, the computing device 20 sends the operating plans for the respective time interval to the corresponding local control device. The operating plan comprises an overall operating plan (power flow at the network connection point; in the case of pure island networks this is always zero) and the partial operating plans of the respective energy producers.

These partial operating plans contain the following information for each time interval:
- activation state of the energy producer (on/off);
- setpoint value of the power delivery;
- optionally shadow prices for production/consumption.

These shadow prices are determined as follows, for example by the function module 44d,
- for production plants, as a ratio of the operating cost variations to the power variations around the working point;
- the energy storage units, as average production costs for that electrical energy which has been used for charging the storage unit;
- for consumers, as an assumed fictitious price, which specifies the order of precedence when switching off (consumers with the highest price are switched off first, and those with the lowest price last: the prices may be established by the operator of the microgrid according to particular criteria, for example importance of the consumer).

The local control unit 18 drives the energy producers by using the transmitted operating plans for the respective time interval, as explained below.

As described above, the local control unit acquires measurement values which describe the respective power delivery of the energy producers, or power demand of the energy consumers, and forms therefrom the power balance of the microgrid in the form of the difference between the delivery and demand. As an alternative, it is also possible to measure the power flow at the network connection point, which corresponds to the power balance.

Furthermore, the local control device determines a positive and a negative reserve power. The positive reserve power $R_{pos}$ is in this case determined as the difference between the maximum possible power delivery and the actual current power delivery of all active (switched-on) energy producers. Correspondingly, the negative reserve power $R_{neg}$ is determined as the difference between the actual current power output and the minimum possible power output of all active energy producers.

With the aid of the values "power balance is good," "positive reserve power" and "negative reserve power," as well as the specifications from the operating plan, real-time regulation of the microgrid is carried out. Deviations from the operating plan, resulting for example from deviations from the predicted weather data and therefore delivery quantities, can in this case be taken into account easily.

In accordance with the specifications from the operating plan, the respective energy producers are switched on or off when the relevant activation state according to the operating plan is on or off in the time interval matching the current time; furthermore, the setpoint value of the power delivery is optionally transmitted as a regulation specification to the respective energy producer.

Figure 5:
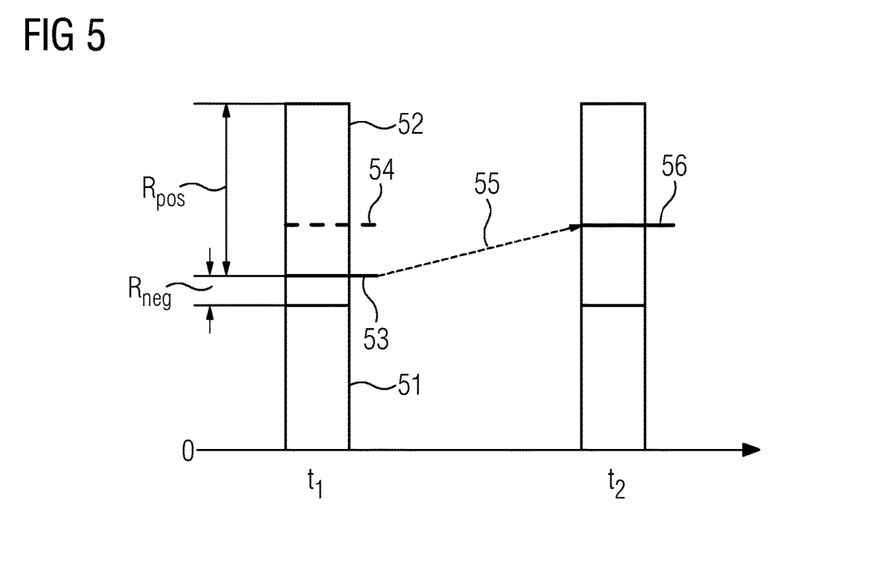
FIG. 5 shows a first bar chart to explain the mode of operation of a microgrid with the local control device.

If, in the operation of the microgrid carried out according to the operating plan, the power balance is less than the magnitude of the positive/negative reserve power, the power delivery of the energy producers is regulated according to the required network frequency. This will be explained with reference to the example of FIG. 5. FIG. 5 shows a bar chart with which the power quotas of the currently activated energy producers are at two different regulation times $t_1$, $t_2$. At time $t_1$, a first subcolumn 51 stands for a power quota of a first activated energy producer, and a second subcolumn 52 correspondingly stands for the power quota of a second energy producer.

The current power delivery of the two energy producers, set according to the operating plan, is specified by a line 53. It can be seen that the first energy producer is fully utilized, and the second is partially utilized. The measured or calculated value of the power balance is specified by a dashed line 54; it can be seen that, at time $t_1$, more power is needed than is delivered by the current specification of the operating plan. In the event that there is coupling to the distribution network, this power is compensated for, for example, by additional demand. In order to continue to operate the microgrid as autonomously and efficiently as possible, in response to the difference between the power balance and the actual delivery, the second energy use is driven by the local control device to deliver a higher power. This is indicated in FIG. 5 by the arrow 55. At the regulation time $t_2$, the power delivery is correspondingly achieved (see line 56) and the microgrid can be further operated in this operating state, without putting additional energy producers into operation. This is possible since, although the power balance has a positive deviation from the actual state, it is nevertheless less than the positive reserve power $R_{pos}$ which is entered by way of example in FIG. 5 (merely by way of example, the negative reserve power $R_{neg}$ is also entered in FIG. 5).

Figure 6:
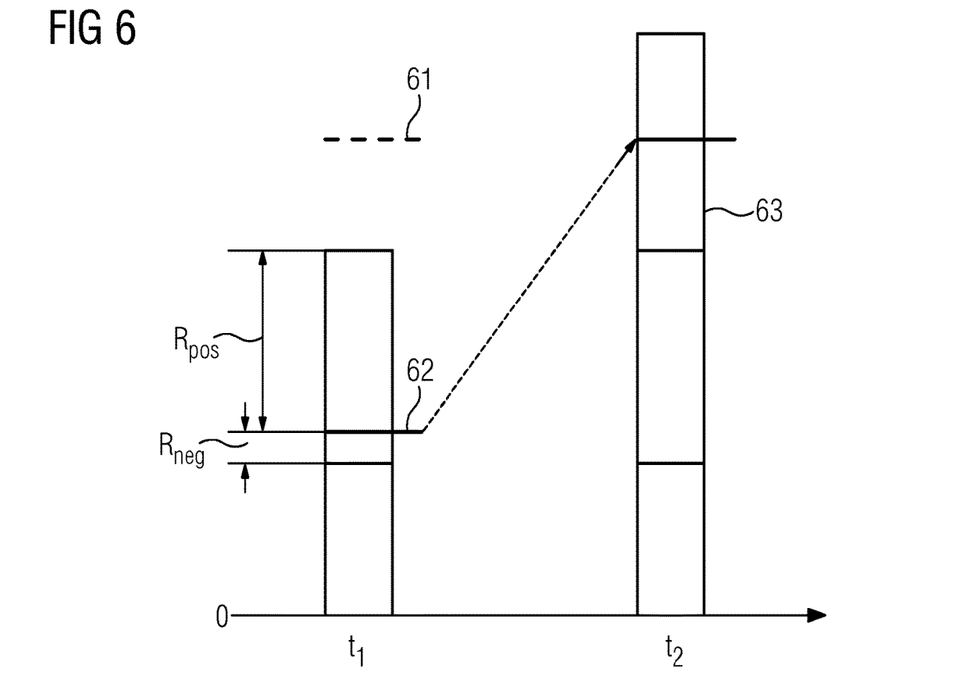
FIG. 6 shows a second bar chart to explain the mode of operation of a microgrid with the local control device.

Another situation is represented by way of example in FIG. 6. Here, the power balance (line 61) lies above the positive reserve power $R_{pos}$, which is given by the current operating state (line 62) and the power quotas of the activated energy producers. For adaptation, a further energy producer is put into operation by the control device, the power quota of which is represented as a subcolumn 63 at the regulation time $t_2$. When selecting the energy producers to be activated, their shadow prices may for example be taken into account. Thus, the energy producers with the lowest energy production costs are always put into operation first, and those with the more expensive energy production costs are only put into operation later if need be.

Figure 7:
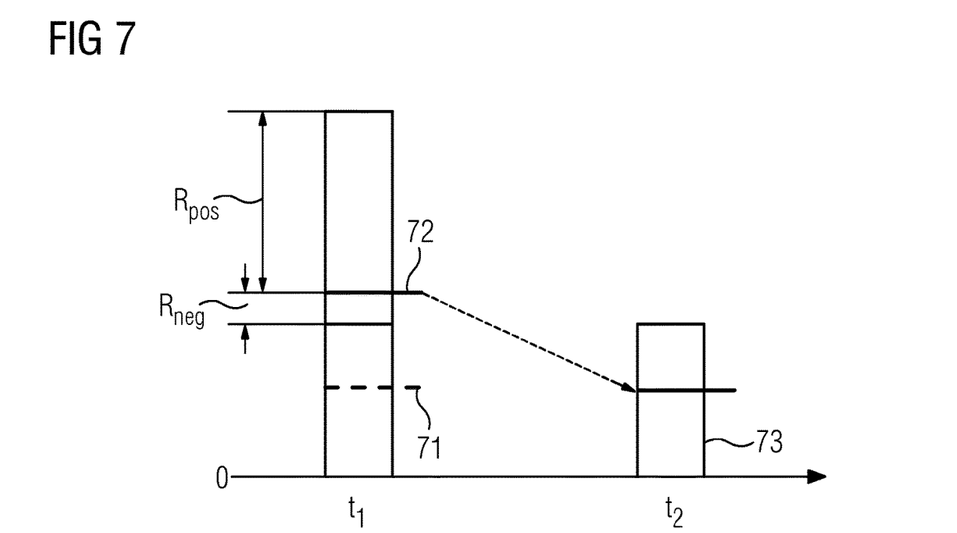
FIG. 7 shows a third bar chart to explain the mode of operation of a microgrid with the local control device.

A further situation is represented by way of example in FIG. 7. Here, the power balance (line 71) lies below the negative reserve power $R_{neg}$, which is given by the current operating state (line 72) and the power quotas of the activated energy producers. For adaptation, an energy producer that was active at time $t_1$ is taken out of operation by the control device, so that only an energy producer with a power quota which is represented as a subcolumn 73 at the regulation time $t_2$ remains activated. When selecting the activated energy producers, their shadow prices may for example be taken into account. When selecting the deactivated energy producers, their shadow prices may likewise for example be taken into account. Thus, the energy producers with the more expensive energy production costs are always taken out of operation first, and those with the lower energy production costs are only taken out of operation later if need be.

If, lastly, the power balance determined is greater than the positive or negative reserve power and the calculated production deficiencies cannot be resolved by switching energy producers on or off, the microgrid enters emergency operation. In this case, if the difference between the delivered power and drawn power is positive, the production plants/batteries with the highest shadow prices are switched off until the difference again lies within the regulation band, or if possible consumers are switched on. If the difference between the delivered power and the drawn power is negative, the consumers/batteries with the lowest shadow prices are switched off until the difference again lies within the regulation band.

The measurement values of the energy producers, or at the network connection point, are sent at cyclic intervals, for example hourly, to the computing device and archived there. In addition, new operational optimization is initiated, which initiates renewed calculation for the remaining duration of the optimization period and/or further time periods. The effect achieved by this is that time- and quantity-integral constraints can be complied with better.

The proposed autonomization concept for the operation of microgrids provides, inter alia, the following advantages:

- In comparison with current complex local modeling, the outlay for the individual microgrid, or the individual energy producers sink drastically since it is no longer necessary to acquire comprehensive model data.
- The local control device can be kept very simple, and it does not require any elaborate technology and complex commissioning.
- The required parameterization on site is reduced to a minimum amount.
- Because of the reduced modeling scope, the plants can be put into operation more rapidly and without specialist technical personnel.
- Because of the simple regulation concept, the solution is compatible with all forms of energy producers for use in microgrids.

The local control device only needs to communicate sporadically with the computing device.

Although the invention has been illustrated and described in detail above with the aid of preferred exemplary embodiments, the invention is not restricted to the examples disclosed, and other variants may be derived therefrom by the person skilled in the art without departing from the protective scope of the appended patent claims.

The invention claimed is:

1. A method of operating an autonomous energy supply network, the energy supply network including a plurality of energy producers and a plurality of energy consumers, and a local control device configured to drive at least one of the energy producers and energy consumers, the method comprising:
providing model data of the autonomous energy supply network in a data memory of a computing device that is superordinate to the local control device, the model data specifying the respective energy producers and associated operating parameters;
determining an operating plan for the autonomous energy supply network with the computing device by using the model data, the operating plan specifying an operating state of the autonomous energy supply network during a particular time interval;
transmitting the operating plan to the local control device; and
driving one or both of the energy producers and the energy consumers with the local control device according to specifications of the operating plan.

2. The method according to claim 1, wherein:
the step of determining the operating plan by way of the computing device for the respective time interval comprises determining an expected delivery power of the respective energy producers; and
using the expected delivery power of the respective energy producers in order to determine the operating plan.

3. The method according to claim 2, which comprises:
determining a weather forecast for a location of the autonomous energy supply network for the respective time interval by way of the computing device; and
for those energy producers whose delivery power depends on a current weather condition at the location of the respective energy producer, determining an expected delivery power for the respective time interval by using that information of the weather forecast which is relevant for the operation of the respective energy producer, and at least some of the model data.

4. The method according to claim 1, which comprises acquiring the model data as user entries via a data editor provided by the computing device or connected thereto, and storing the model data in a data memory of the computing device.

5. The method according to claim 1, wherein the computing device is a data processing device configured as a cloud computer system.

6. The method according to claim 1, wherein the operating plan for the respective time interval comprises an overall operating plan, which specifies an electrical power at a network connection point of the autonomous energy supply network, and partial operating plans for the energy producers and/or energy consumers of the autonomous energy supply network.

7. The method according to claim 6, wherein the partial operating plans respectively comprise at least one specification of an activation state and a setpoint value for the power output or the power demand of the respective energy producer or energy consumer.

8. The method according to claim 7, wherein the partial operating plans also comprise a specification of costs which are incurred during an energy production of the respective energy producer or the energy consumption of the respective energy consumer.

9. The method according to claim 6, which comprises:
during operation of the autonomous energy supply network by the local control device, forming a current power balance of the autonomous energy supply network as a difference between a power delivered to the autonomous energy supply network and a power drawn therefrom;
determining with the local control device a positive reserve power and a negative reserve power of the autonomous energy supply network;
comparing the current power balance with the positive reserve power and the negative reserve power; and
using a result of the comparing step for driving the energy producers.

10. The method according to claim 9, which comprises:
when a power balance is less than or equal to the positive or negative reserve power, driving the respectively switched-on energy producers correspondingly in order to adapt their power to be delivered; and
when the power balance which is greater than the positive or negative reserve power, modifying an activation state of at least one energy producer.

11. The method according to claim 10, which comprises, if a power balance is greater than the positive or negative reserve power and there is no further energy producer whose activation state can be modified, modifying an activation state of at least one energy consumer.

12. The method according to claim 1, which comprises:
acquiring measurement values which specify an operating state of the energy producers and/or energy consumers and/or of the entire autonomous energy supply network at a network connection point by way of the local control device during operation of the autonomous energy supply network;
transmitting at least some of the measurement values and/or values derived therefrom to the computing device; and
determining with the computing device an updated operating plan for the current time interval or a time interval subsequent thereto by using the transmitted measurement values and/or the values derived therefrom.

13. The method according to claim 1, which comprises:
determining with the computing device respective operating plans for a plurality of autonomous energy supply networks; and
driving the respective energy producers and/or energy consumers of the plurality of autonomous energy supply networks by the respective local control device according to the specifications of the respective operating plan.

14. A system for operating an autonomous energy supply network, the autonomous energy supply network having a number of energy producers and a number of energy consumers, the system comprising:
a local control device configured to drive the energy producers and/or the energy consumers; and
a computing device that is superordinate to said local control device, said computing device including a data memory for providing model data of the autonomous energy supply network, which specify the respective energy producers and their operating parameters;

said computing device being adapted to determine an operating plan for the autonomous energy supply network by using the model data and to transmit the operating plan to said local control device, the operating plan specifying an operating state of the autonomous energy supply network during a particular time interval; and said local control device being configured to drive the energy producers and/or the energy consumers according to the specifications of the operating plan.

15. The system according to claim 14, wherein:
the system is configured to operate a plurality of autonomous energy supply networks; and
the respective autonomous energy supply networks each have a respectively assigned local control device connected to said computing device.

16. A method of operating an autonomous energy supply network, the energy supply network including a plurality of energy producers and a plurality of energy consumers, and a local control device configured to drive at least one of the energy producers and energy consumers, the method comprising:

providing model data of the autonomous energy supply network in a data memory of a computing device that is superordinate to the local control device, the model data specifying the respective energy producers and associated operating parameters;

determining an operating plan for the autonomous energy supply network with the computing device by using the model data, the operating plan specifying an operating state of the autonomous energy supply network during a particular time interval;

transmitting the operating plan to the local control device; and driving one or both of the energy producers and the energy consumers with the local control device according to specifications of the operating plan;

the operating plan for the respective time interval being an overall operating plan, which specifies an electrical power at a network connection point of the autonomous energy supply network, and partial operating plans for the energy producers and/or energy consumers of the autonomous energy supply network;

the partial operating plans respectively including at least one specification of an activation state and a setpoint value for the power output or the power demand of the respective energy producer or energy consumer, and the partial operating plans also including a specification of costs which are incurred during an energy production of the respective energy producer or the energy consumption of the respective energy consumer.

17. A method of operating an autonomous energy supply network, the energy supply network including a plurality of energy producers and a plurality of energy consumers, and a local control device configured to drive at least one of the energy producers and energy consumers, the method comprising:

providing model data of the autonomous energy supply network in a data memory of a computing device that is superordinate to the local control device, the model data specifying the respective energy producers and associated operating parameters;

determining an operating plan for the autonomous energy supply network with the computing device by using the model data, the operating plan specifying an operating state of the autonomous energy supply network during a particular time interval;

transmitting the operating plan to the local control device; and driving one or both of the energy producers and the energy consumers with the local control device according to specifications of the operating plan;

the operating plan for the respective time interval being an overall operating plan, which specifies an electrical power at a network connection point of the autonomous energy supply network, and partial operating plans for the energy producers and/or energy consumers of the autonomous energy supply network; and during operation of the autonomous energy supply network by the local control device, forming a current power balance of the autonomous energy supply network as a difference between a power delivered to the autonomous energy supply network and a power drawn therefrom;

determining with the local control device a positive reserve power and a negative reserve power of the autonomous energy supply network;

comparing the current power balance with the positive reserve power and the negative reserve power; and using a result of the comparing step for driving the energy producers.

18. The method according to claim 17, which comprises:
when a power balance is less than or equal to the positive or negative reserve power, driving the respectively switched-on energy producers correspondingly in order to adapt their power to be delivered; and
when the power balance which is greater than the positive or negative reserve power, modifying an activation state of at least one energy producer.

19. The method according to claim 17, which comprises, if a power balance is greater than the positive or negative reserve power and there is no further energy producer whose activation state can be modified, modifying an activation state of at least one energy consumer.

20. A system for operating an autonomous energy supply network, the energy supply network including a plurality of energy producers and a plurality of energy consumers, and a local control device configured to drive at least one of the energy producers and energy consumers, the system comprising:

a computing device that is superordinate to the local control device of the energy supply network, said computing device having a data memory with model data of the autonomous energy supply network, the model data specifying the respective energy producers and associated operating parameters;

said computing device being configured to determine an operating plan for the autonomous energy supply network by using the model data, the operating plan specifying an operating state of the autonomous energy supply network during a particular time interval;

the operating plan for the respective time interval includes an overall operating plan, which specifies an electrical power at a network connection point of the autonomous energy supply network, and partial operating plans for the energy producers and/or energy consumers of the autonomous energy supply network;

the partial operating plans respectively including at least one specification of an activation state and a setpoint value for the power output or the power demand of the respective energy producer or energy consumer, and the partial operating plans also including a specification of costs which are incurred during an energy production of the respective energy producer or the energy consumption of the respective energy consumer; and said computing device being configured to transmit the operating plan to the local control device, and one or both of the energy producers and the energy consumers is operated with the local control device according to specifications of the operating plan.

21. A system for operating an autonomous energy supply network, the energy supply network including a plurality of energy producers and a plurality of energy consumers, and a local control device configured to drive at least one of the energy producers and energy consumers, the system comprising:

a computing device that is superordinate to the local control device of the energy supply network, said computing device having a data memory with model data of the autonomous energy supply network, the model data specifying the respective energy producers and associated operating parameters;

said computing device being configured to determine an operating plan for the autonomous energy supply network by using the model data, the operating plan specifying an operating state of the autonomous energy supply network during a particular time interval;

the operating plan for the respective time interval including an overall operating plan, which specifies an electrical power at a network connection point of the autonomous energy supply network, and partial operating plans for the energy producers and/or energy consumers of the autonomous energy supply network;

wherein, during an operation of the autonomous energy supply network by the local control device, a current power balance of the autonomous energy supply network is formed as a difference between a power delivered to the autonomous energy supply network and a power drawn therefrom;

wherein the local control device determines a positive reserve power and a negative reserve power of the autonomous energy supply network, the current power balance is compared with the positive reserve power and the negative reserve power; and a result of the comparison is used for driving the energy producers; and said computing device being configured to transmit the operating plan to the local control device, and one or both of the energy producers and the energy consumers is operated with the local control device according to specifications of the operating plan.

* * * * *